United States Patent Office 3,395,141
Patented July 30, 1968

3,395,141
PREPARATION OF SULFAMETHAZINE AND
ACETYL SULFAMETHAZINE
Lawrence James Ross, North Plainfield, and Pandurang
Krishnacharya Nargund, Somerville, N.J., assignors to
American Cyanamid Company, Stamford, Conn., a corporation of Maine
No Drawing. Filed Apr. 29, 1966, Ser. No. 546,198
4 Claims. (Cl. 260—239.75)

ABSTRACT OF THE DISCLOSURE

The purity and yield of sulfamethazine or acetyl sulfamethazine from the reaction of sulfaguanidine or acetyl sulfaguanidine and 2,4-pentanedione (acetylacetone) is improved by reacting in an aqueous acidic buffered solution (pH 3.0 to 6.0) with the beta-diketone in excess, and at approximately the boiling point. A longer chain diketone may be used for corresponding other 2-p-aminobenzenesulfonamido-4,6-dialkylpyrimidines.

Sulfamethazine and acetylsulfamethazine are pharmaceutical specialities. Sulfamethazine is frequently prescribed for the treatment of infections, and acetylsulfamethazine is readily hydrolyzed to sulfamethazine.

---

This invention relates to an improved process for the preparation of sulfamethazine and acetyl sulfamethazine by reacting sulfaguanidine or acetylsulfaguanidine with 2,4-pentanedione in the presence of an aqueous acidified buffer solution yielding a product of high purity and high yields, and analogous products having longer side chains, up to 4 carbons in each, using corresponding diketones.

The reaction is essentially:

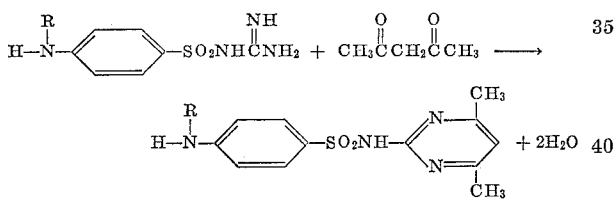

where R is hydrogen or an acetyl group

Sulfamethazine is the dimethyl derivative of sulfadiazine and is sometimes the compound of choice for therapeutic usage. At other times the acetyl derivative of sulfamethazine is the derivative of choice.

Patent 2,435,002, Process for the Manufacture of Para-Aminobenzene-Sulphonamidopyrimidines, Hartmann and von Meyenburg, Jan. 27, 1948, discloses the reaction of acetyl sulfaguanidine with 2,4-pentanedione (there named acetylacetone). U.S. Patent 3,119,818, Garzia, Process for Preparing 2 - p - Aminobenzene-Sulphonamido - 4,6 - Dimethylpyrimidine, Jan. 28, 1964, discloses a number of methods of making sulfamethazine including the reaction of sulfaguanidine and 2,4-pentanedione.

The various processes disclosed in these patents have served a useful purpose in teaching methods of making sulfamethazine, but in common with many chemical processes, further improvements are always desired, to reduce costs and make drugs available to the public at as low a price as is compatible with assured quality.

It has now been discovered that sulfamethazine and acetylsulfamethazine of pharmaceutical grade and in yields in excess of 93% of theory can be obtained by reacting sulfaguanidine or acetylsulfaguanidine with 2,4-pentanedione in an acidified aqueous buffer solution. This is surprising in view of the fact that in the absence of acid and buffer, or in the presence of acid alone, the yield and/or the purity of the product are much lower. It is also surprising in view of the fact that the process is equally effective with both sulfaguanidine and acetylsulfaguanidine, since the latter has been regarded as "sluggish."

The practical advantages of the process of the present invention are of considerable importance and are easily understood. They are:
(1) A higher product yield.
(2) A higher purity without subsequent purification steps.
(3) No need for recovery of the expensive starting material or any other materials.
(4) Adaptability of the process to acetylsulfaguanidine.
(5) Elimination of checking pH range during course of reaction and making additions to control such value.

According to the process of the present invention a buffer solution in water is acidified, starting materials added and allowed to react at elevated temperatures, then the reaction mixture is cooled and the product isolated in pharmaceutical grade purity in yields of over 93% based on sulfaguanidine.

Among the buffers that may be employed in the aqueous solution are alkali metal salts of weak acids which give an alkaline solution. These buffer salts may be a salt or lithium, sodium, potassium, calcium, barium or magnesium or mixtures thereof. Usually the sodium salt is the cheapest and hence economically preferable. Suitable acid components of the buffer salts, with the ionization constant of such acids, include:

Acid:
| | |
|---|---:|
| Acetic | $1.76 \times 10^{-5}$ |
| Acetoacetic | $2.62 \times 10^{-4}$ |
| Adipic | $3.71 \times 10^{-5}$ |
| Benzoic | $6.46 \times 10^{-5}$ |
| n-Butyric | $1.54 \times 10^{-5}$ |
| Iso-butyric | $1.44 \times 10^{-5}$ |
| n-Caproic | $1.43 \times 10^{-5}$ |
| Iso-caproic | $1.46 \times 10^{-5}$ |
| Citric | $8.2 \times 10^{-4}$ |
| Formic | $1.77 \times 10^{-4}$ |
| Glutaric | $4.58 \times 10^{-5}$ |
| Heptanoic | $1.28 \times 10^{-5}$ |
| Hexanoic | $1.31 \times 10^{-5}$ |
| Malonic | $1.4 \times 10^{-3}$ |
| Octanoic | $1.28 \times 10^{-5}$ |
| Oxalic | $6.1 \times 10^{-5}$ |
| m-Phthalic | $2.9 \times 10^{-4}$ |
| o-Phthalic | $1.3 \times 10^{-3}$ |
| p-Phthalic | $3.1 \times 10^{-4}$ |
| Propionic | $1.34 \times 10^{-5}$ |
| Succinic | $6.89 \times 10^{-5}$ |
| Tartaric | $1.1 \times 10^{-3}$ |
| o-Toluic | $1.22 \times 10^{-4}$ |
| m-Toluic | $5.32 \times 10^{-5}$ |
| p-Toluic | $4.33 \times 10^{-5}$ |
| n-Valeric | $1.51 \times 10^{-5}$ |
| Iso-valeric | $1.7 \times 10^{-5}$ |
| o-Boric | $7.3 \times 10^{-10}$ |
| Tetraboric | $1.0 \times 10^{-4}$ |
| o-Phosphoric | $7.52 \times 10^{-3}$ |

The acid may be described as a weak acid having no reactive function other than the acid function. Where the acid is a dibasic or a polybasic acid the constant is for a hydrogen having an ionization constant of less than $10^{-3}$. For example with oxalic acid, sodium hydrogen oxalate would be the acid. The buffering action of only the second hydrogen would be considered. Mixtures of these buffer salts may be used. For economic reasons usually the sodium salt of a low cost acid, such as sodium acetate is preferred.

Generally, water-soluble acids having an ionization constant of $10^{-3}$ or less are suitable. The amount of buffer salt preferred varies with the molecular weight of said salt, but generally is in the range of between 1 and 25%, preferably between 5 and 10%, by weight based on the theoretical sulfamethazine yield. The amount of water employed in the reaction mixture may vary considerably. However, the range of about 25–60% of the total reaction mixture and preferably 30–50% by weight is most useful. More dilute solutions give good results, but require a bigger reactor.

The solution of the buffer in water has an alkaline pH; i.e. greater than 7. Acid is added to said solution to reduce the pH to between about 3.0 and about 6.0, preferably between 3.5 and 5.5. Among the acids that may be used are those useful in forming the buffer salts, although it is not necessary for the same acid to be employed for both purposes. Better yield and improved purity is obtained if the system is acidified with one of the weak acids than if acidified with a strong mineral acid such as hydrochloric, sulfuric or nitric.

In the present invention an excess of 2,4-pentanedione is used. An excess between 10 and 50% of 2,4-pentanedione, preferably within the range of about 25 to 35% gives the best yields. Excesses of sulfaguanidine or acetyl guanidine are to be avoided. Separation of sulfaguanidine or acetylguanidine from the sulfamethazine or acetyl sulfamethazine is very difficult as all of them are solids. The 2,4-pentanedione is a liquid, which boils at a point slightly higher than water. It is somewhat water-soluble, and under the preferred conditions, any remaining excess is dissolved in the residual water at the end of the process and may be washed out with water. The 2,4-pentanedione may be steam distilled from aqueous systems. By water washing a pharmaceutical grade of sulfamethazine or acetyl sulfamethazine is readily obtained. The purity is in excess of 99% and is usually determined by measuring the melting point.

The reaction mixture is heated to between about 90 and 120° C. preferably in the range of 95 to 110° C. to allow the reaction to occur. The time may vary from about 24 to about 144 hours. Good results are obtained in from 60 to 80 hours. Conveniently, commercially, the reaction period is a few hours short of 72 hours, or three days, so that a reaction kettle may be unloaded, reloaded, allowed to react for three days and, on the third day the process repeated. If, because of weekends or holidays a longer cycle is convenient, an extra day or two of reaction does not adversely affect the yield or the product, although the yield and the product purity are not increased sufficiently to justify a longer schedule. The reaction vessel may be an open tank or kettle, but more conveniently is a closed type of kettle, but not a pressure vessel. It is operated at near the boiling point. A slight reflux gives good results. If a reflux condenser is not handy the kettle can be closed and heated to 100° C. or slightly above without boiling up enough pressure to require a special pressure vessel, and by the same token the steam and chemicals from the reaction are not permitted to escape into the room. For safety sake a standard pressure disc is normally mounted on the vessel so that if the pressure rises markedly above ambient pressure, the vessel is vented to a safe area. Normally, automatic temperature controls and mechanical stirring are employed so that no attention to the reaction is necessary during the reaction period. In effect the reaction vessel can be set, the stirrer started, and left under automatic control until the third day when the vessel is emptied and recharged.

At the end of the reaction period the reaction mixture is diluted with an equal volume of water and cooled below 50° C., then filtered, washed with hot water and dried. The amount of dilution water is not critical but is governed by convenience. If diluted with approximately an equal volume the reaction slurry is cooled by the water and is thin enough so that it may be conveniently filtered or centrifuged and the product then washed. If a much larger volume of water is added in dilution, the filtration time is necessarily correspondingly lengthened without advantages, and larger vessels are required. With a much smaller volume, the slurry is thicker and more difficult to handle.

Glass-lined reaction kettles currently available are usually rated at a pressure of at least 80 and sometimes up to 250 lbs. per square inch so that enough pressure can be conveniently used to avoid loss of reactants without venting, and yet maintain a temperature in the vicinity of 100° C. If the temperature goes appreciably above 100° C. the pressure builds up. If temperatures above about 115° C. are used with pressure, the yield may be adversely affected.

The invention is described above, and defined as set forth in the accompanying claims. To aid in the understanding of the invention the following examples are set forth which illustrate but do not represent all variations which are useful.

In the following examples all parts are by weight, and temperatures are centigrade, unless otherwise specified.

Example 1

To a glass-lined vessel was charged 2800 parts of water and 200 parts of sodium acetate. Glacial acetic acid was added until the pH value was between 4.95 and 5.10, approximately 85 parts of acid were required. To this buffer solution with stirring were added 2390 parts of sulfaguanidine monohydrate (10.3 moles) and 1350 parts of 2,4-pentanedione (13.5 moles). The vessel was sealed and the mixture heated to 100–105° C. The mixture was held at this temperature with stirring for 72 hours. The reaction mixture was then diluted with an equal quantity of water, cooled to below 50° C., filtered, washed with 7500 parts of hot water and tray dried. Sulfamethazine was obtained, a white powder, in 93.8% yield based on sulfaguanidine charged, which had a melting point range of 197.6–198.8° C. and an assay of 100.0% on the dried basis. The specifications of The Pharmacopeia of the United States of America, XVII (1965), for sulfamethazine are that melting point must be in the range of 197–200° C. and its assay must be no less than 99.0% calculated on the dried basis.

Example 2

The process of Example 1 was repeated except that no buffer salt was present, that is the sodium acetate was omitted. Sulfamethazine was obtained in 83.5% yield with a melting point range of 195–196.5° C. and an assay of 98.0% on the dried basis.

This example shows that in the absence of a buffer salt the yield and purity of product are below that of the present invention, and below U.S.P. requirements.

Example 3

Into a suitable reactor was charged 1550 parts of 2,4-pentanedione and 2390 parts of sulfaguanidine monohydrate. The mixture was rapidly heated to 125–130° C. and refluxed in this temperature range for five hours and an additional five hours at 130–135° C. The mixture was then cooled to 105° C. and 2880 parts of water were added. The mixture was stirred for 48–72 hours at this temperature and some of the excess 2,4-pentanedione recovered by steam distillation. The mixture was then diluted with an equal volume of water, cooled to below 50° C., filtered, washed with hot water and dried. The yield was 2450 parts of sulfamethazine (85% of theory based on the sulfaguanidine charged) which had a melting point range of 194.5–196° C. and an assay of 97.5%.

This example shows that in the absence of buffer salt, water and acid, the product obtained is of lower yield and purity than obtained by the present invention. The purity is markedly below U.S.P. requirements, and would require recrystallization, or other processing steps, with further cost and loss of yield.

Example 4

The procedure of Example 1 is repeated except that 2637 parts of acetylsulfaguanidine (10.3 moles) is substituted for the sulfaguanidine. Additionally citric acid is substituted for acetic acid in acidifying the buffer solution and the pH value reached is 4.5. There is obtained 2458 parts of acetylsulfamethazine which has a melting point of 245.2–246.2° C. and an assay of 99.9% on a dried basis.

In the above examples parts are given by weight of the reactants in a substantially anhydrous form. Where such reactants are available in the anhydrous form or containing some water, such reactants may conveniently be used in the same system by adjusting the starting quantity of water to allow for the amount of water which is added with such component. Sulfamethazine and acetylsulfamethazine are sulfa drugs of choice. Analogous sulfa drugs can be prepared in which the 4,6 components are lower alkyl groups other than methyl by selection of a suitable starting material. A diketone is required in which the ketone groups are separated by a single methylene. The group on the outside of the ketone groups is conveniently methyl in each instance to give the 4,6 dimethyl derivative known as sulfamethazine. If either or both of these groups are ethyl, propyl, isopropyl or one of the butyls, the corresponding 4,6 dialkyl sulfapyrimidine is produced. The examples and descriptions given above are equally applicable to such higher homologs. As the dimethyl derivative is at present the drug choice, the examples are written to show the present preferred commercial embodiment.

We claim:

1. A process for making 2-p-aminobenzenesulfonamido-4,6-dimethylpyrimidine or its acetyl derivative which comprises reacting sulfaguanidine or acetyl sulfaguanidine with 2,4-pentanedione in the presence of an aqueous acidified buffer system, said buffer system consisting of from 1% to 25% by weight of the theoretical product yield of an alkali metal salt of a weak acid which has an ionization constant of less than $10^{-3}$, acidified to a pH between about 3.0 and about 6.0 with a weak acid, not necessarily the same as present in the buffer salt, said acid having an ionization constant of less than $10^{-3}$, by heating, with stirring, at approximately the boiling point, within the pH range of about 3.0 to about 6.0; and after reaction has occurred diluting with additional water, cooling to below 50° C. and filtering, said 2,4-pentanedione being in about 10% to 50% in excess so that residual sulfaguanidine or acetyl sulfaguanidine is minimized and a pharmaceutically acceptable grade of product is obtained directly by separation of the product from the aqueous phase and washing with additional water.

2. The process of claim 1 in which the starting material is sulfaguanidine and sulfamethazine is the product.

3. The process of claim 1 in which acetyl sulfaguanidine is the starting material and acetylsulfamethazine is the resulting product.

4. A process for making 2-p-aminobenzene sulfonamido-4,6-dimethylpyrimidine comprising adding about 2390 parts of sulfaguanidine, as the monohydrate, and about 1350 parts of 2,4-pentanedione to an aqueous acidic buffer solution consisting of a mixture of about 2800 parts of water, 200 parts of sodium acetate, and acetic acid to a pH between about 4.95 to 5.10 and heating to about 100° to 105° C. for about at least 72 hours, thereby reacting the sulfaguanidine with the 2,4-pentanedione; said 2,4-pentanedione being in excess so that residual sulfaguanidine is minimized; diluting the reaction mixture with an equal quantity of water, cooling below about 50° C., filtering, washing the filter cake with about 7500 parts of hot water, and drying, thereby obtaining about a 93.8% yield of 2-p-aminobenzenesulfonamido-4,6-dimethylpyrimidine, with a melting point range above 197° C., and an assay of about 100%, said product as so produced being a pharmaceutically acceptable grade.

References Cited
FOREIGN PATENTS 973,372  10/1964  England.

JOHN D. RANDOLPH, *Primary Examiner.*

H. I. MOATZ, *Assistant Examiner.*

UNITED STATES PATENT OFFICE
CERTIFICATE OF CORRECTION

Patent No. 3,395,141                                                           July 30, 1968

Lawrence James Ross et al.

It is certified that error appears in the above identified patent and that said Letters Patent are hereby corrected as shown below:

Column 2, line 25, "or", first occurrence, should read -- of --.
Column 3, line 55, "boiling" should read -- building --. Column 5, line 12, "anhydrous" should read -- hydrous --.

Signed and sealed this 14th day of April 1970.

(SEAL)
Attest:

Edward M. Fletcher, Jr.                          WILLIAM E. SCHUYLER, JR.
Attesting Officer                                  Commissioner of Patents